United States Patent [19]

Lei

[11] Patent Number: 5,347,325
[45] Date of Patent: Sep. 13, 1994

[54] ADJUSTABLE TEMPLE FOR GLASSES

[76] Inventor: Tony Lei, No. 15, Lane 30, Chung Shan 7th St., Tainan City, Taiwan

[21] Appl. No.: 140,626

[22] Filed: Oct. 25, 1993

[51] Int. Cl.$^5$ .................................................. G02C 5/20
[52] U.S. Cl. .................................. 351/118; 351/111; 351/119
[58] Field of Search ............... 351/118, 119, 116, 111; 2/448, 449, 450

[56] References Cited

U.S. PATENT DOCUMENTS 1,591,181  7/1926  Pollmiller ............................ 351/118
3,556,644  12/1967  Stahl ................................... 351/118

*Primary Examiner*—William L. Sikes
*Assistant Examiner*—Hung Xuan Dang
*Attorney, Agent, or Firm*—Morton J. Rosenberg; David I. Klein

[57] ABSTRACT

An adjustable temple for glasses is to divide the foot of the temple into two separate parts, a foot and an ear hook. The foot includes a C shaped slot at one end having a sinewave shaped portion at bottom edge of the opening end. The ear hook includes a reduced portion integrally formed at one end adopted to insert into the slot of the foot. A rail is formed at one side of the rail adopted to guide the reduced portion to slide in the slot, and a protuberance is formed on the rail to be clamped in the sinewave shaped portion to confine movement of the rail within the slot.

1 Claim, 4 Drawing Sheets

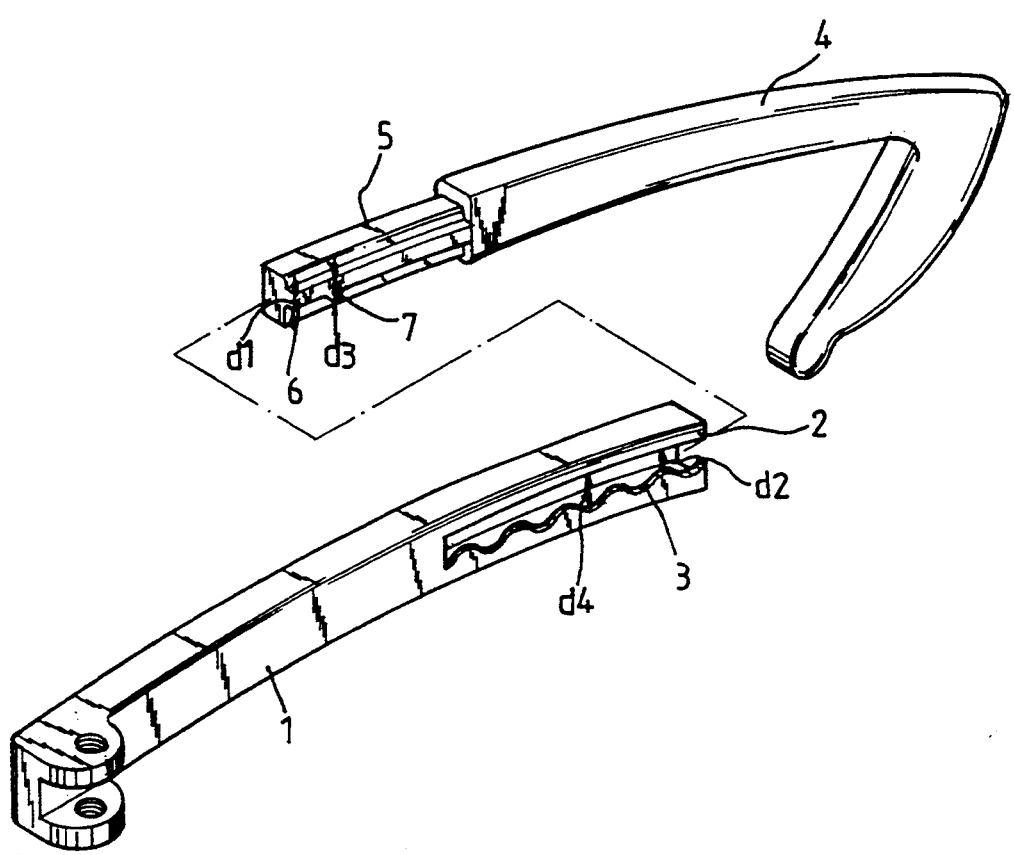
F I G . 1

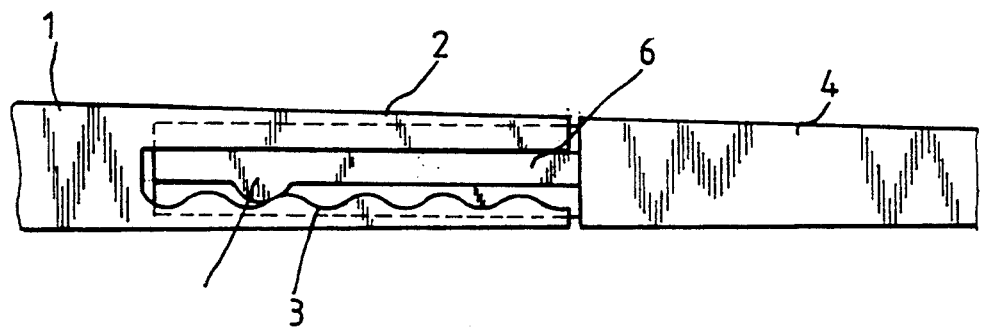
F I G . 2
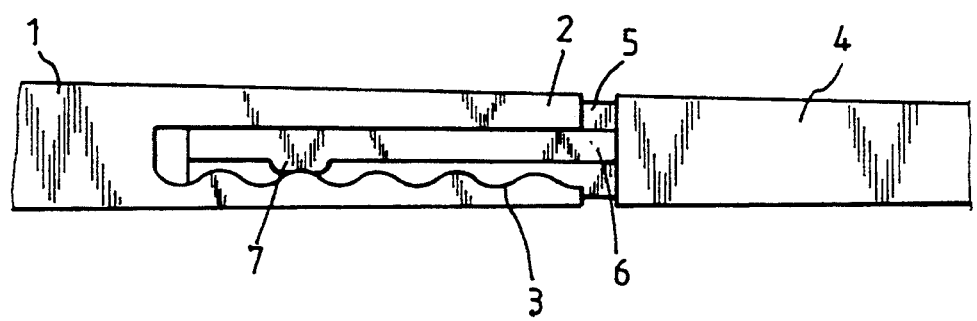
F I G . 3
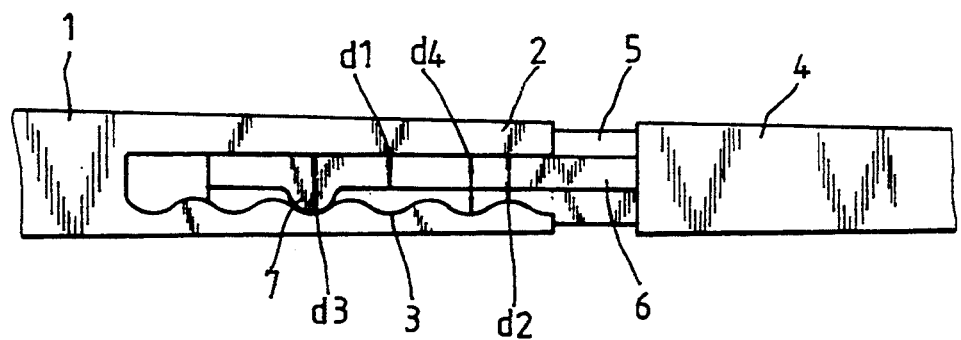
F I G . 4

ADJUSTABLE TEMPLE FOR GLASSES

FIELD OF THE INVENTION

This invention relates to glasses. More particularly, a glasses frame comprises a pair of adjustable feet.

BACKGROUND OF THE PRIOR ART

Glasses are invented at a long time ago for people to correct their eye sight or to isolate sunshine direct into their eyes. Because each person has a different dimension of head, the requirement of feet lengths are also different, and therefore, glasses with adjustable feet are invented which includes two parts, a foot A and an ear hook B, as shown in FIG. 6. The foot A has a trough F at one end and a plurality of holes C on the trough F. The ear hook B includes an integral rail D at one end having a protuberance E thereon adopted to extend from any one of the holes C, as shown in FIG. 7 to hold the hook B firmly. In order to adust the protuberance E from one hole C to the other hole C, it is necessary to have a larger interior dimension of the trough F. However, the larger interior dimension has also caused some shortcomings, such as the rail E will vibrate in the trough F, and it may cause disentanglement when user is having an exercise.

It is therefore, an object to the inventor to invent the present invention to improve the above mentioned shortcomings.

SUMMARY OF THE INVENTION

It is the primary object of the present invention to provide an adjustable temple for glasses which feet are adjustable to accommodate user with different dimension of head.

It is another object of the present invention to provide an adjustable temple for glasses which can hold the foot and the ear hook steady.

It is a further object of the present invention to provide an adjustable temple for glasses which is easy to operate.

It is still a further object of the present invention to provide an adjustable temple for glasses which is inexpensive to produce.

BRIEF DESCRIPTION OF THE DRAWINGS

FIG. 1 is a fragmentary view of the present invention;

FIGS. 2, 3 & 4 are side elevational view of FIG. 1 showing corelationship between a slot and a rail.

DETAILED DESCRIPTION OF THE DRAWINGS

Figure 5:
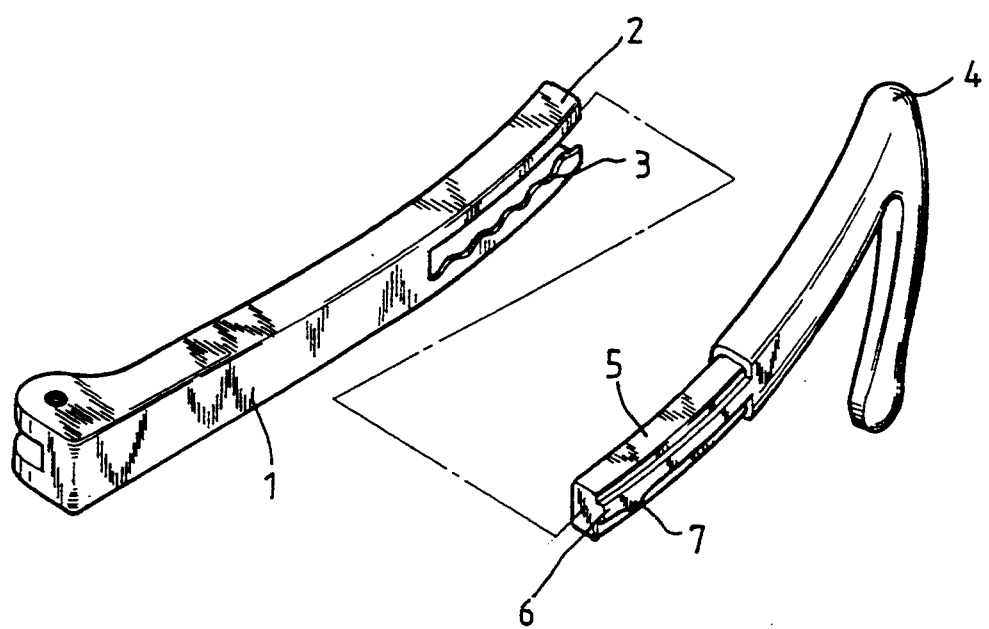
FIG. 5 is a fragmentary view of a second embodiment of the present invention.
Figure 6:
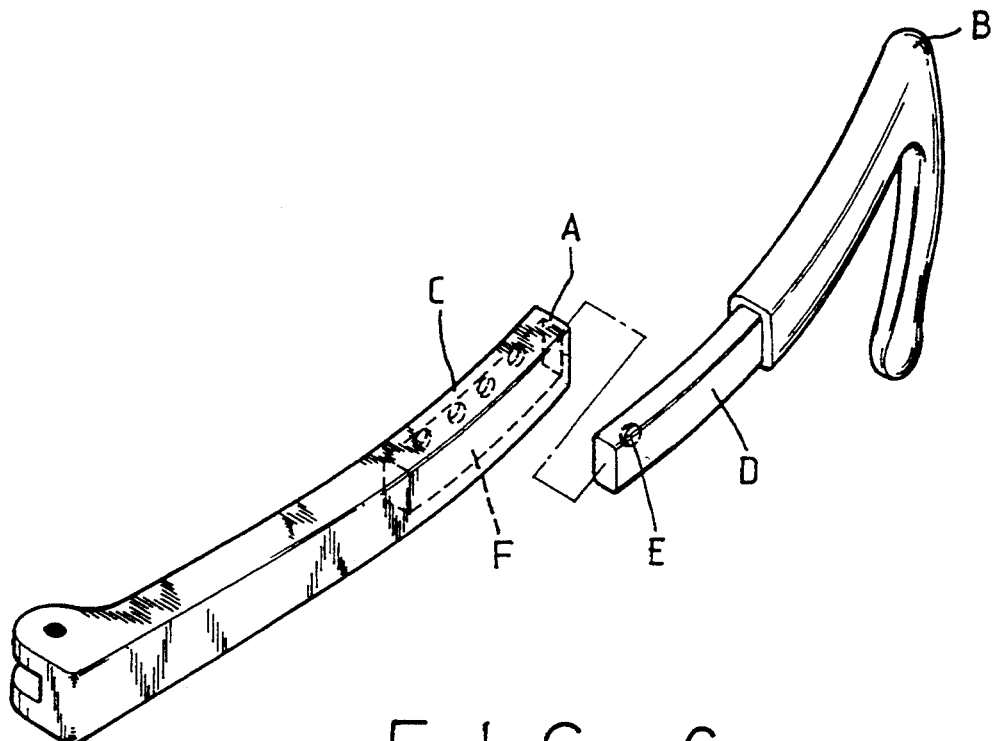
FIG. 6 is a fragmentary view of Prior Art.
Figure 7:
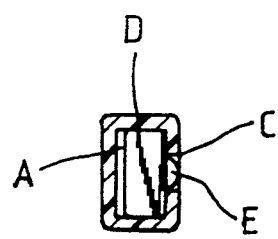
FIG. 7 is a cross sectional view of FIG. 6, taken along line 1—1.

Referring now to the drawings wherein the showings are for the purpose of illustrating preferred embodiments only and not for the purpose of limiting the same, FIGS. 1 & 5 and two fragmentary views of the present invention which includes generally a foot 1, and an ear hook 4.

The foot 1 has a C shaped slot 2 at one end having a sinewave shaped portion 3 at bottom edge of the opening portion of the slot 2 and a flat at top portion thereof.

The ear hook 4 includes a reduced portion 5 integrally formed at one end of the hook 4. The reduced portion 5 has a rail 6 extending along one side thereof and a protuberance 7 made from plastic material protruding from the rail 6. The reduced portion 5 is adopted to slide in the trough 2 of the foot 1 while the rail 6 is to guide the reduced portion 5 slide steady.

The rail 6 has a thickness d1 smaller than the distance d2 which is defined from the peak point of the sinewave shaped portion 3 to the flat top portion of the opening portion, and the thickness from the rail 6 to the protuberance 7, herein defined as d3, equals to the distance between the off-peak point of the sinewave shaped portion 3 to the flat top portion thereof. Therefore, when pulling the ear hook 4, the protuberance 7 will deform when it encounters with the peak point of the notch 3, as shown in FIGS. 2 & 3 that allows the ear hook 4 to move in the slot 2. Upon the reaching the offpeak point, as shown in FIG. 4, the protuberance 7 will return to its original position. No matter of what shape it may be, the protuberance 7 will produce a friction which prevents the ear hook 4 from freely sliding in the slot 2.

I claim:
1. An adjustable temple for glasses comprising:
   a foot having a C shaped slot at one end, said slot having a sinewave shaped portion at bottom edge and a flat edge at top portion thereof;
   an ear hook having an integral reduced portion at one end adapted to slide in said slot of said foot, said reduced portion having a rail at one side thereof and a protuberance extending from said rail, and being characterized in that said protuberance produces friction in said slot to prevent free movement of said ear hook.

* * * * *